United States Patent
Tiger et al.

(10) Patent No.: US 9,843,454 B2
(45) Date of Patent: *Dec. 12, 2017

(54) TECHNIQUES FOR CONTEXTUAL MOBILE DATA ACCESS

(71) Applicant: Facebook, Inc., Menlo Park, CA (US)

(72) Inventors: Roi Tiger, Tel Aviv (IL); Erbil Karaman, San Francisco, CA (US)

(73) Assignee: FACEBOOK, INC., Menlo Park, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/498,806

(22) Filed: Apr. 27, 2017

(65) Prior Publication Data
US 2017/0230190 A1    Aug. 10, 2017

Related U.S. Application Data

(63) Continuation of application No. 14/574,524, filed on Dec. 18, 2014, now Pat. No. 9,667,808.

(51) Int. Cl.
| | |
|---|---|
| *H04M 11/00* | (2006.01) |
| *H04L 12/14* | (2006.01) |
| *H04W 4/24* | (2009.01) |
| *H04L 29/08* | (2006.01) |
| *H04M 15/00* | (2006.01) |

(52) U.S. Cl.
CPC ...... *H04L 12/1432* (2013.01); *H04L 12/1492* (2013.01); *H04L 67/28* (2013.01); *H04M 15/46* (2013.01); *H04M 15/58* (2013.01); *H04M 15/72* (2013.01); *H04M 15/85* (2013.01); *H04W 4/24* (2013.01); *H04M 15/8214* (2013.01)

(58) Field of Classification Search
None
See application file for complete search history.

(56) References Cited

U.S. PATENT DOCUMENTS 9,667,808 B2 * 5/2017 Tiger ................ H04M 15/8214

* cited by examiner

*Primary Examiner* — Erika Washington

(57) ABSTRACT

Techniques for contextual mobile data access are described. In one embodiment, an apparatus may comprise a mobile device with a local gateway utility. The local gateway utility may be operative to receive a network request on a device, determine that the network request corresponds to a context-specific data plan for the device, the context-specific data plan authorizing performance of the network request through a zero-rated proxy server, and perform the network request for the application using the zero-rated proxy server as an intermediary. Other embodiments are described and claimed.

20 Claims, 11 Drawing Sheets

*500*

```
┌─────────────────────────────────────────────────┐
│  Receive a network request at a local gateway   │
│            utility on a mobile device.          │
│                       502                       │
└─────────────────────────────────────────────────┘
                         │
                         │
┌─────────────────────────────────────────────────┐
│  Determine that the network request corresponds │
│  to a context-specific data plan for the mobile │
│  device, the context-specific data plan         │
│  authorizing performance of the network request │
│           through a zero-rated proxy server.    │
│                       504                       │
└─────────────────────────────────────────────────┘
                         │
                         │
┌─────────────────────────────────────────────────┐
│  Perform the network request using the zero-    │
│          rated proxy server as an intermediary. │
│                       506                       │
└─────────────────────────────────────────────────┘
```

Receive a network request at a zero-rated proxy server from a mobile device.
*602*

Determine that the network request corresponds to a context-specific data plan for the mobile device, the context-specific data plan authorizing performance of the network request through the zero-rated proxy server.
*604*

Perform the network request using the zero-rated proxy server as an intermediary.
*606*

*FIG. 6*

TECHNIQUES FOR CONTEXTUAL MOBILE DATA ACCESS

This application is a continuation application of U.S. patent application Ser. No. 15/574,524, now U.S. Pat. No. 9,667,808, titled "TECHNIQUES FOR CONTEXTUAL MOBILE DATA ACCESS,", filed Dec. 18, 2014, which is hereby incorporated by reference in its entirety.

BACKGROUND

Users may perform network data access using mobile devices connected to cellular data networks. The cellular data networks may use metered data. The amount of data transferred across a cellular data network may be monitored and debited against a user allocation of data. Similarly, the amount of data transferred across a cellular data network may be monitored and the user billed a fee based on the amount. However, some cellular data access may be performed against zero-rated servers, wherein the cellular system does not meter access to the zero-rated servers: the user allocation is not debited and no amount-based fee is generated for the traffic exchanged with the zero-rated servers.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Various embodiments are generally directed to techniques for contextual mobile data access. Some embodiments are particularly directed to techniques to application-specific and resource-specific data plans for contextual mobile data access. In one embodiment, for example, an apparatus may comprise a mobile device with a local gateway utility. The local gateway utility may be operative to receive a network request on a device, determine that the network request corresponds to a context-specific data plan for the device, the context-specific data plan authorizing performance of the network request through a zero-rated proxy server, and perform the network request for the application using the zero-rated proxy server as an intermediary. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 5 illustrates an embodiment of a first logic flow for the system of FIG. 1.

FIG. 6 illustrates an embodiment of a second logic flow for the system of FIG. 1.

DETAILED DESCRIPTION

Figure 1:
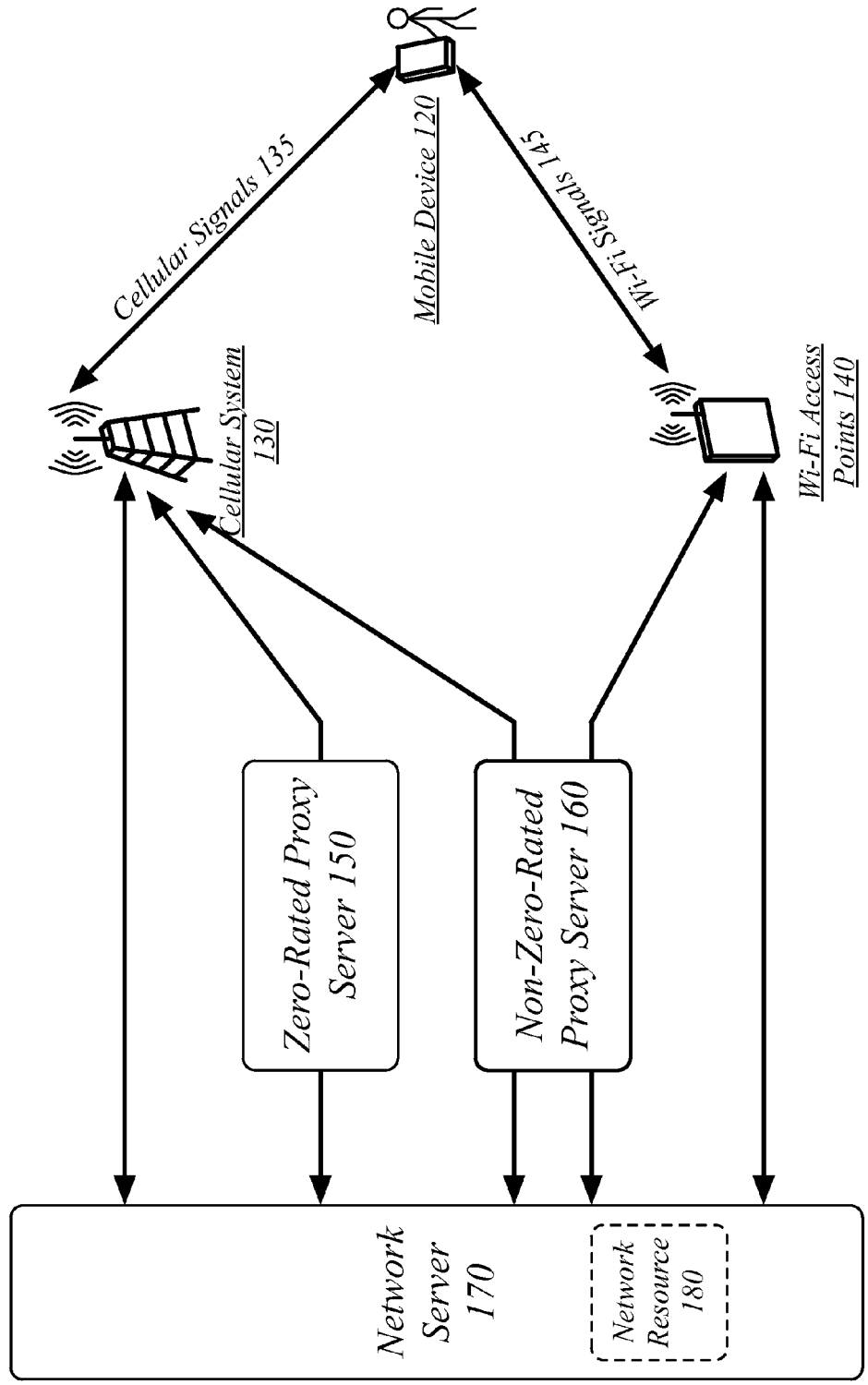
FIG. 1 illustrates an embodiment of a selective zero-rating system.

Various embodiments are directed to techniques to offer and implement context-specific data plans for mobile devices on cellular networks. Mobile devices may execute a wide array of mobile applications. Many of these mobile applications may make use of network data in their performance of their operations. Unfortunately, unlike the assigned number of minutes a user may have on a cellular voice plan, users may not have significant awareness of or control over the data access performed by mobile applications. For example, a user may find that a free or low-cost video streaming application is expensive to use due to significant data access, either absorbing much or all of a user's cellular data allocation or alternatively or additionally generating data usage fees. Where a user purchases blocks of cellular data (e.g., purchases a 50 megabyte of cellular data allocation), the user may find themselves frequently purchasing additional blocks in order to allow for a data-intensive application to work. Further, where a data-intensive application has used up a user's allocation, other applications with more modest data usage may be prevented from operating until the user purchases an additional data allocation.

As such, a user may be benefited by being empowered to purchase application-specific or resource-specific data plans that provide unlimited data access for a set period of time. For instance, a user might purchase a data plan that provides unlimited cellular data access to a multiplayer gaming application for thirty days. A user might purchase a data plan that provides unlimited streaming of video for a soccer tournament for the duration of the tournament. A user might purchase a data plan that provides a trial thirty minute unlimited data plan for a Voice over Internet Protocol (VoIP) application during an introductory period with the VoIP application. These plans may work in combination with a conventional data allocation, such that cellular data usage that doesn't correspond to an application or resource with a specific data plan is debited against the data allocation, while cellular data usage that corresponds to an application or resource with a specific data plan is not debited against the data allocation and may proceed even where a data allocation for a mobile device has been expended. It will be appreciated that a plan promoted as unlimited may have a set limit, the limit set above any normal usage under the plan. For example, a video streaming data plan may provide for significant video streaming, but not accommodate 24/7 video streaming.

These data plans may be priced according to a predicted amount of cellular data that will be used if users are allowed unlimited cellular data usage in the context to which the data plans are specific. For example, a data plan for a video streaming application may be priced higher than a data plan for a text-based messaging application for the same length of time due to the greater amount of network traffic expected to be produced by the video streaming application. This may serve to ensure that cellular providers are appropriately compensated for the use of their network while providing transparency and advance notification to users of the cost of using various applications and accessing various resources using a cellular network. Cellular providers may further benefit from increased use of their cellular network, with associated increased revenue, due to increased confidence in their customers in using their network due to the greater knowledge and control the customers have over their data usage.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

FIG. 1 illustrates a block diagram for a selective zero-rating system 100. In one embodiment, the selective zero-rating system 100 may comprise a computer-implemented system having software applications comprising one or more components. Although the selective zero-rating system 100 shown in FIG. 1 has a limited number of elements in a certain topology, it may be appreciated that the selective zero-rating system 100 may include more or less elements in alternate topologies as desired for a given implementation.

It is worthy to note that "a" and "b" and "c" and similar designators as used herein are intended to be variables representing any positive integer. Thus, for example, if an implementation sets a value for a=5, then a complete set of components 122 illustrated as components 122-1 through 122-a may include components 122-1, 122-2, 122-3, 122-4 and 122-5. The embodiments are not limited in this context.

A mobile device 120 may perform various operation using network data accessed over a network. The mobile device 120 may access a cellular system 130 using cellular signals 135. The cellular system 130 may be a cellular network including data access, the cellular system 130 provided by a cellular provider with which the user of the mobile device 120 has a service contract, the service contract for cellular data server to the mobile device 120. The cellular system 130 may be a metered network, in which data access is priced, at least in part, according to an amount of data transferred over the network. The cellular data service contract may be a pre-paid contract in that a cellular data allocation is purchased prior to use providing a specific allocation, with general cellular data access (e.g., cellular data access to a non-zero-rated address) cut off once the cellular data allocation is exhausted. The cellular data service contract may be a subscription contract providing longer-term cellular data access. A subscription contract may include a cellular data allocation, but may also allow for cellular data use beyond the exhaustion of the cellular data allocation, with any further use generating additional fees. For example, a cellular data subscription may include 1 GB of cellular data per month, with access to zero-rated resources not debited against the allocation, with an additional charge for each full or partial additional gigabyte of cellular data used each month.

The mobile device 120 may access one or more Wi-Fi access points 140 using Wi-Fi signals 145. Wi-Fi access points 140 may be provided by a plurality of different operators. Some of the Wi-Fi access points 140 may be personal in nature, such as a home Wi-Fi network operated by the user of mobile device 120 based on a domestic Internet connection. Some of the Wi-Fi access points 140 may be free of charge or provided as a complimentary portion of a service, such as free Wi-Fi service in coffee shops, hotels, and other public accommodations. Some of the Wi-Fi access points 140 may require payment for use. However, the Wi-Fi access points 140 may be generally non-metered networks, in which, whether or not access is free or paid, there are no fees for use of the Wi-Fi access points 140 generated based on an amount of data transferred over the networks.

The mobile device 120 may access a network resource 180 hosted on a network server 170. The network resource 180 may comprise any network-accessible resource. The network resource 180 may be retrieved by the mobile device 120, such as in the reception of a video download, video stream, music download, web page view, or any other reception of data across a network. The network resource 180 may be stored on the network server 170, such as the uploading of an image, video, audio file, text message, or any other transmission of data across a network. Accessing the network resource 180 may include both transmitting and receiving data, such as the transmission of a request and the reception of a response, the submission of data and the reception of responding data, or any other two-way exchange of data across a network. The mobile device 120 may, in various circumstances, use either of a cellular system 130 or Wi-Fi access points 140 to access the network resource 180 on the network server 170.

The mobile device 120 may communicate with network server 170 without the use of any intermediary proxy server. The mobile device 120 may use either of cellular system 130 or Wi-Fi access points 140 to access the network server 170 without the network transaction being passed through a proxy server. In some embodiments, one or both of the cellular system 130 and Wi-Fi access points may use a proxy server internal to their operations, in which case direct access to the network server 170 may be interpreted as access without the use of third-party proxy servers external to the Wi-Fi access points 140 or cellular system 130.

Some cellular access may be "zero rated." Zero-rated cellular access may not contribute to capped free cellular data communication that may be included in a cellular customer's plan or pre-paid purchase. Zero-rated cellular access may not generate a fee to the cellular customer, even if that customer is over a limited quantity of allocated or pre-paid cellular data access, or where such an allocated or pre-paid cellular data access does not exist. Zero-rated cellular access may be dependent on the specific network accessed, with the cellular carrier having a list of one or more network addresses—such as internet protocol (IP) addresses—to which cellular customers have zero-rated access. This list may vary between cellular carriers.

The network server 170 may not be zero-rated with the cellular system 130. As such, any direct access to the network server 170, including network resource 180, that uses cellular system 130 may result in data allocation usage. The mobile device 120 may therefore be benefited by, where possible, using a zero-rated proxy server 150 to access the network server 170 and other non-zero-rated devices. Data access by the mobile device 120 through the cellular system 130 to the zero-rated proxy server 150 will not result in data allocation usage due to the zero-rated proxy server 150. The zero-rated proxy server 150 may be operative to access the network server 170 and thereby network resource 180 on behalf of the mobile device 120. As the zero-rated proxy server 150 is outside of the cellular system 130, the cellular provider does not bill or debit the operator of the zero-rated proxy server 150 for the data exchange with the network server 170. Because the zero-rated proxy server 150 is zero-rated with the cellular system 130, the cellular provider does not bill or debit the user of mobile device 120 for the data exchange with the zero-rated proxy server 150. If the network exchange with the zero-rated proxy server 150 allows proxy access to the network server 170, then the use of the zero-rated proxy server 150 may allow for zero-rated access to the network server 170—and thereby to the network resource 180—by the mobile device 120 even without the network server 170 being zero-rated by the cellular system 130.

However, the cellular system 130 may only zero-rate the zero-rated proxy server 150 if the zero-rated proxy server 150 agrees to only act as a proxy for network transactions for which the mobile device 120 has one or more context-specific data plans relevant to the context of the network transactions. The zero-rated proxy server 150 may therefore serve as the mechanism for implementing context-specific data plans: cellular data traffic provided for under one or more context-specific data plans for the mobile device 120 may be tunneled through the zero-rated proxy server 150 to avoid data fees or data allocation debiting while cellular data traffic not provided for under any context-specific data plan for the mobile device 120 is excluded from using the zero-rated proxy server 150.

In some embodiments, the mobile device 120 may be used with a proxy server whether or not it is on a metered network. A proxy server may provide utility to the mobile device 120 beyond the benefit of avoiding data fees and data allocation debiting. For example, a proxy server may transcode media to reduce bandwidth, perform caching to increase performance, and provide other benefits. As such, the mobile device 120 may use a non-zero-rated proxy server 160 when using a non-metered network such as the networks provided by Wi-Fi access points 140. Similarly, the non-zero-rated proxy server 160 may be used when using a metered network such as the cellular system 130 for network transactions for which the mobile device 120 is not authorized to receive the benefit of zero rating (i.e., where no context-specific data plan is relevant to the transaction). These same benefits beyond zero-rating may also be provided by the zero-rated proxy server 150 when in use for a transaction.

Figure 2:
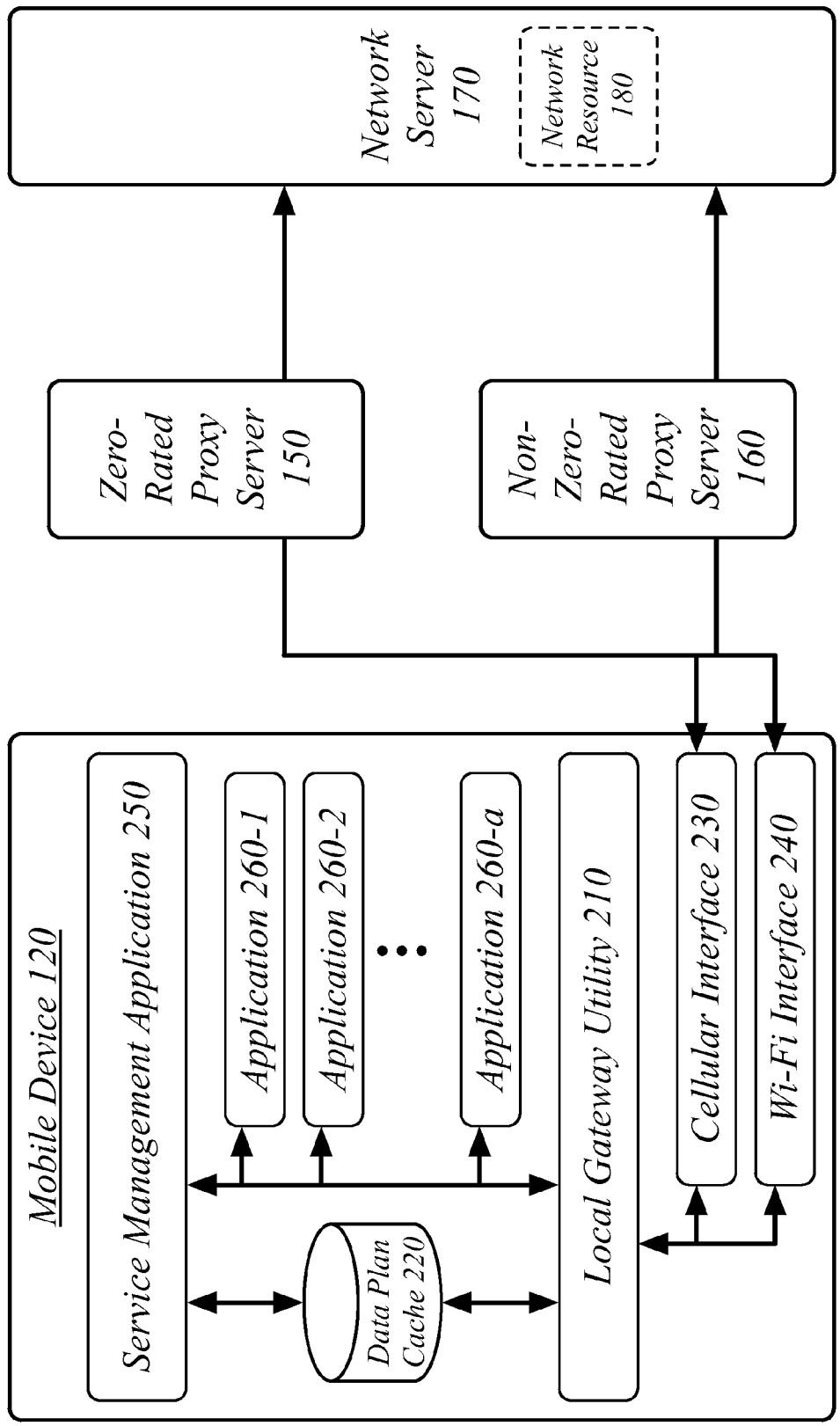
FIG. 2 illustrates an embodiment of a mobile device for use with the selective zero-rating system.

FIG. 2 illustrates an embodiment of a mobile device 120 for use with the selective zero-rating system. The mobile device 120 may be operative to execute a plurality of applications 260, a service management application 250, and a local gateway utility 210.

Exchanging network traffic, such as performing zero-rated network request 165, may comprise transmitting and receiving network traffic via a network interface controller (NIC). A NIC comprises a hardware component connecting a computer device, such as mobile device 120, to a computer network. The NIC may be associated with a software network interface empowering software applications to access and use the NIC. Network traffic may be received over the computer network as signals transmitted over data links. The network traffic may be received by capturing these signals and interpreting them. The NIC may receive network traffic over the computer network and transfer the network traffic to memory storage accessible to software applications using a network interface application programming interface (API). The mobile device 120 may comprise a cellular interface 230 for access to the cellular system 130 and a Wi-Fi interface 240 for access to Wi-Fi access points 140.

A local gateway utility 210 may be present on a mobile device 120 to empower the mobile device 120 to make use of the proxy servers and manage the operation of the mobile device 120 and its applications 260 with the proxy servers. Network traffic of the mobile device 120 that is exchanged via the proxy servers may be transmitted through the local gateway utility 210. Exchanging network traffic via the local gateway utility 210 may comprise using a network interface application programming interface (API) generally providing access to networks accessible to the mobile device 120. For instance, the client operating system (OS) of the mobile device 120 may automatically select a network interface from a plurality of network interfaces according to a priority of the network interfaces.

The local gateway utility 210 may be the highest-priority network interface of the plurality of network interfaces. The local gateway utility 210 may be of a higher priority than a cellular interface 230, but be of lower priority other network interfaces (e.g., a Wi-Fi interface 240) access to which is not managed by the local gateway utility 210. Alternatively, the local gateway utility 210 may also be of a higher priority than the Wi-Fi interface 240 as well, such that all network traffic is channeled through the local gateway utility 210. The local gateway utility 210 may be operative to manage access to selective zero-rating and to ensure that zero-rating via tunneling to non-zero-rated servers through a zero-rated proxy server 170 is only performed where provided for by a context-specific data plan active for the mobile device 120

In some embodiments, applications 260 using local gateway utility 210 may first be registered with the client OS or local gateway utility 210 before the local gateway utility 210 is a prioritized network interface for the applications 260. A user of mobile device 120 may have to opt-in to a privacy policy associated with local gateway utility 210 prior to local gateway utility 210 being used as a network interface for applications 260.

Selective zero-rating system 100 may include an authorization server (or other suitable component(s)) that allows users to opt in to or opt out of having their actions logged by selective zero-rating system 100 or shared with other systems (e.g., third-party systems), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers or other authorization components may be used to enforce one or more privacy settings of the users of proxy servers 150, 160 through blocking, data hashing, anonymization, or other suitable techniques as appropriate.

The local gateway utility 210 may be operative to receive a network request from an application of a plurality of application 260 on a mobile device 120, determine that the network request corresponds to a context-specific data plan for the mobile device 120, the context-specific data plan authorizing performance of the network request through a zero-rated proxy server 150, and perform the network request for the application using the zero-rated proxy server 150 as an intermediary. The local gateway utility 210 and the application may both be locally executed on the mobile device 120.

The local gateway utility 210 may retrieve a plurality of cached context-specific data plans from a data plan cache 220 on the mobile device 120. The data plan cache 220 may store active context-specific data plans for the mobile device 120 locally to the mobile device 120 for fast access without the use of network resources. In some embodiments, the data plan cache 220 may also comprise inactive context-specific data plans, the inactive context-specific data plans cached on the device in anticipation of potentially offering the inactive context-specific data plans to the user of the mobile device 120. The local gateway utility 210 may match the application against the plurality of cached context-specific data plans to determine the context-specific data plan authorizing performance of the network request through the zero-rated proxy server 150. This identified context-specific data plan may comprise an application-specific data plan authorizing zero-rating of the network request through of use of the zero-rated proxy server 150, this authorization associated with a specific period of time. The local gateway utility 210 may be operative to determine that the identified context-specific data plan is active based on a comparison between the active time period for the context-specific data plan and the current date and time as known to the mobile device 120. The application performing the request may be identified by, for example, referencing a socket number for the incoming network request against an OS socket table listing the applications responsible for each socket. The network request may be received from the application on the mobile device 120, with the context-specific data plan defining a period of time for which the mobile device 120 is authorized to perform network requests for the application through the zero-rated proxy server 150.

The local gateway utility 210 may retrieve a plurality of cached context-specific data plans from a data plan cache 220 on the mobile device 120, determine a network address associated with the network request, and match the network address against the plurality of cached context-specific data plans to determine the context-specific data plan authorizing performance of the network request through the zero-rated proxy server 150. This identified context-specific data plan may comprise a network-address-specific data plan. This may be used where access to a particular type of network resource 180, for example streaming video via a particular video streaming service, is authorized independent of the application originating the request. The network request may be addressed to the network address, with the context-specific data plan defining a period of time for which the mobile device 120 is authorized to perform network requests addressed to the network address through the zero-rated proxy server 150.

In some cases, a context-specific data plan may be specific to a particular network resource 180, such as a specific video stream or audio stream. For example, a context-specific data plan may be purchased allowing access to a video stream of a concert event. The network request may therefore correspond to the network resource 180, with the context-specific data plan defining a period of time for which the mobile device 120 is authorized to access the network resource 180 through the zero-rated proxy server 150.

In some embodiments, authorization to use the zero-rated proxy server 150 may be handled remotely. For example, rather than retrieving the context-specific data plan from the data plan cache 220, a check may be made against an authorization server. The authorization server may be a same device as the zero-rated proxy server 150 or may use a distinct device. The authorization server may be zero-rated to avoid data charges or data usage debiting for determining whether access to the zero-rated proxy server 150 is authorized. The local gateway utility 220 may determine an application identifier identifying an application associated with the network request and transmit the application identifier to an authorization server, the authorization server operative to determine that the network request corresponds to the context-specific data plan for the mobile device 120, the context-specific data plan authorizing access to the network resource through the zero-rated proxy 150. The local gateway utility 220 may determine a network address associated with the network request and transmit the network address to an authorization server, the authorization server operative to determine that the network request corresponds to the context-specific data plan for the mobile device 120, the context-specific data plan authorizing access to the network resource through the zero-rated proxy 150.

A service management application 250 on the mobile device 120 may be operative to manage the active context-specific data plans for the mobile device 120. The service management application 250 may be operative to allow a user to view their currently-active context-specific data plans, select additional currently-active context-specific data plans, and otherwise perform activities related to context-specific data plans.

Figure 3:
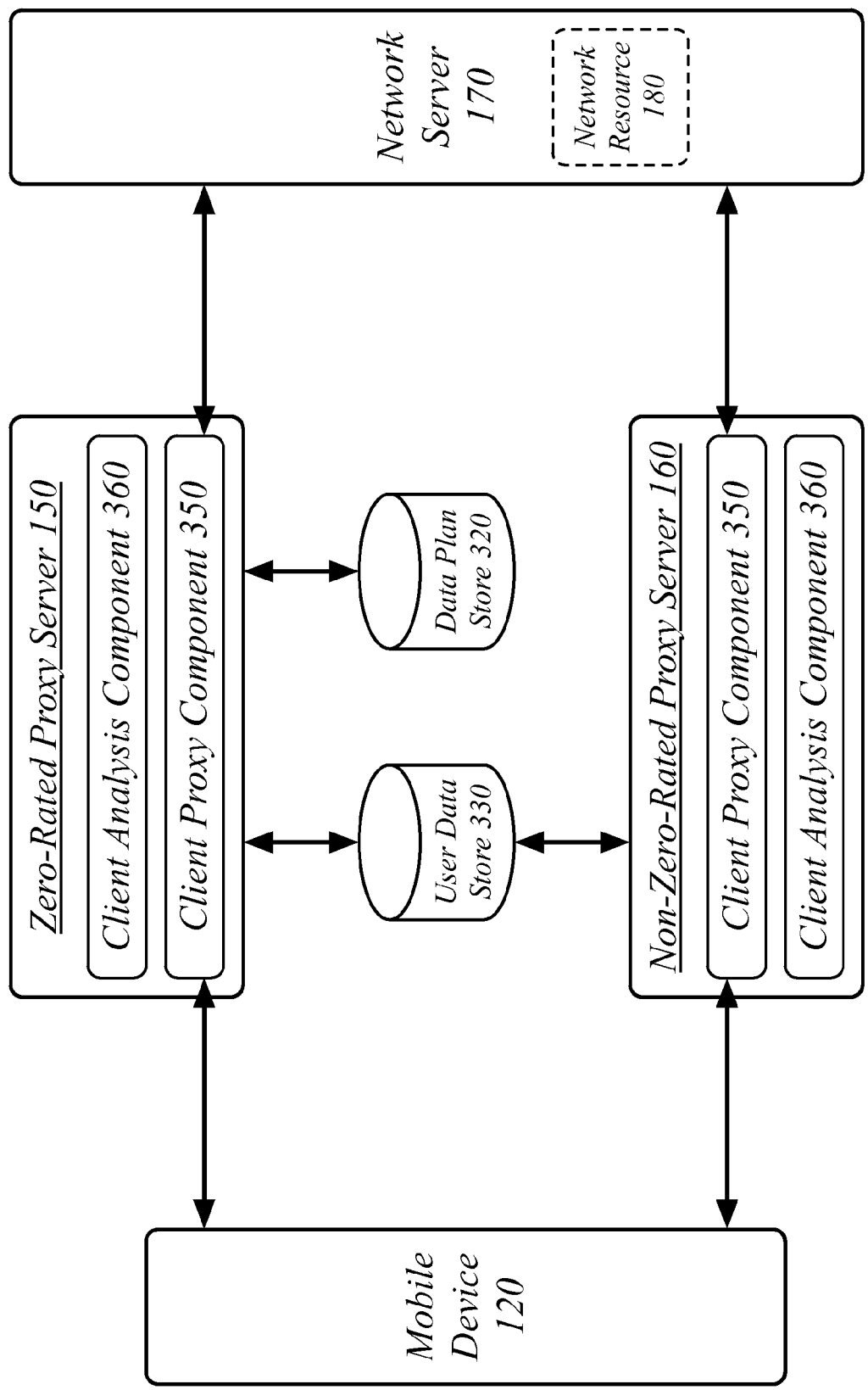
FIG. 3 illustrates an embodiment of a zero-rated proxy server and a non-zero-rated proxy server.

FIG. 3 illustrates an embodiment of a zero-rated proxy server 150 and a non-zero-rated proxy server 160.

The zero-rated proxy server 150 may have access to a data plan store 320. The data plan store 320 may store context-specific data plans for the mobile device 120 and other mobile devices served by the zero-rated proxy server 150. The data plan store 320 may store associations between mobile devices and those context-specific data plans which those mobile devices have active. The data plan store 320 may store a record for each mobile device 120 served by the zero-rated proxy server 150 indicating what context-specific data plans are active and authorizing the mobile device 120 to use the zero-rated proxy server 150. The data plan store 320 may be stored locally to the zero-rated proxy server 150 or on a separate device, such as on network-accessible storage. For instance, multiple zero-rated proxy servers may be in operation with all of the zero-rated proxy servers operative to access data plan associations for mobile devices form the data plan store 320. The zero-rated proxy server 150 may comprise a data plan cache for mobile devices currently accessing the zero-rated proxy server 150, that frequently use the zero-rated proxy server 150, that have recently used the zero-rated proxy server 150, or that are assigned to the zero-rated proxy server 150.

The zero-rated proxy server 150 and the non-zero-rated proxy server 160 may each have access to a user data store 330. The user data store 330 may store data related to the users of mobile devices and to the network activities of mobile devices. For example, the user data store 330 may store information logged by the proxy servers 150, 160 as to what applications are used by mobile devices and what network resources are accessed by mobile devices. A client analysis component 360 on each of the proxy servers 150, 160 may be operative to monitor network activity by mobile devices being served by the proxy servers 150, 160 and log information related to those network activities in the user data store 330.

The mobile device 120 may be operative to use the zero-rated proxy server 150 when on a metered network and using an application for which the mobile device 120 has an active context-specific data plan authorizing use of the zero-rated proxy server 150 for the activities of that application. The mobile device 120 may be operative to use the zero-rated proxy server 150 when on a metered network and accessing a network server 170 for which the mobile device 120 has an active context-specific data plan authorizing use of the zero-rated proxy server 150 for access to that network server 170. The mobile device 120 may be operative to use the zero-rated proxy server 150 when on a metered network and accessing a network resource 180 for which the mobile device 120 has an active context-specific data plan authorizing use of the zero-rated proxy server 150 for access to that network resource 180. The mobile device 120 may be operative to use the non-zero-rated proxy server 160 otherwise.

The mobile device 120 may be operative to use the non-zero-rated proxy server 160 when not on a metered network, whether or not an active context-specific data plan would authorize use of the zero-rated proxy server 150. Alternatively, the zero-rated proxy server 150 may be used even when on a non-metered network.

The mobile device 120 may be operative to use the non-zero-rated proxy server when on either a metered network or non-metered network and using an application for which the mobile device 120 does not have any active context-specific data plan authorizing use of the zero-rated proxy server 150 for the activities of that application. The mobile device 120 may be operative to use the non-zero-rated proxy server when on either a metered network or non-metered network and accessing a network server 170 for which the mobile device 120 does not have any active context-specific data plan authorizing use of the zero-rated proxy server 150 for access to the network server 170. The mobile device 120 may be operative to use the non-zero-rated proxy server when on either a metered network or non-metered network and accessing a network resource 180 for which the mobile device 120 does not have any active context-specific data plan authorizing use of the zero-rated proxy server 150 for access to the network resource 180.

The proxy servers 150, 160 may comprise a client proxy component 350 for the performance of proxy services. The proxy servers 150, 160 may be operative to limit access to proxy services through the use of authentication procedures. A mobile device 120 may authenticate to the client proxy component 350 to verify its identity and authorization to use the client proxy component 350 for the tunneling of network activity. In some embodiments, the Socket Secure (SOCKS) protocol may be used to authenticate mobile devices and perform network communication for proxy services.

The client proxy component 350 for the zero-rated proxy server 150 may be further operative to only provide proxy tunneling for network traffic with an associated context-specific data plan active on the mobile device 120 producing the network traffic. The client proxy component 350 may be operative to identify a network server 170 or network resource 180 as the destination of the network traffic and determine that the data plan store 320 indicates that a context-specific data plan allowing unmetered access to that network server 170 or network resource 180 is active for the mobile device 120 and to forward the network traffic, and any responses to the network traffic, in response to the determination that the data plan store 320 indicates that the context-specific data plan is active for the mobile device 120. Similarly, the client proxy component 350 may be operative to identify an application responsible for the network traffic and determine that the data plan store 320 indicates that a context-specific data plan allowing unmetered use of the application is active for the mobile device 120 and to forward the network traffic, and any responses to the network traffic, in response to the determination that the data plan store 320 indicates that the context-specific data plan is active for the mobile device 120.

In some cases, live determination of the application responsible for network traffic may be impractical. In these cases, the client analysis component 360 may be operative to retrospectively determine the responsible application after the network activity of the application is completed. While in some cases the responsible application may be clear from the destination of network activity (e.g., to a network server specific to an application), in other cases the application may only be identified based on patterns within the network activity. If the local gateway utility 210 of a mobile device 120 attempts to perform network activity via the zero-rated proxy server 150 that should not have been allowed, this may be interpreted as indicating inappropriate activity on behalf of the user or a developed of an application for the mobile device 120 and cause an alert to be sent to an administrator of the zero-rated proxy server 150 for further investigation.

In some embodiments, the local gateway utility 210 may be provided with a security token for use in accessing the proxy servers 150, 160. In some embodiments, each purchased context-specific data plan may result in a security token being stored on the mobile device 120, with the security token identifying the context-specific data plan with which it associated. In these embodiments, the client proxy component 350 may require a context-specific security token for access in order to determine what network activity should be allowed. The local gateway utility 210 may, in response to determining that a cached context-specific data plan is appropriate for a network request, retrieve the context-specific security token and include it with the performance of the network request via the client proxy component 350 of the zero-rated proxy server 150. Where an application is identified by the context-specific security token, the client analysis component 360 may be operative to compare network activity to known traffic patterns for the application to determine whether the actual application is being used. Where the comparison indicates that a different application is actually being used, this may be indicated in an alert sent to an administrator of the zero-rated proxy server 150 to identify which application is being spoofed by another application.

Figure 4:
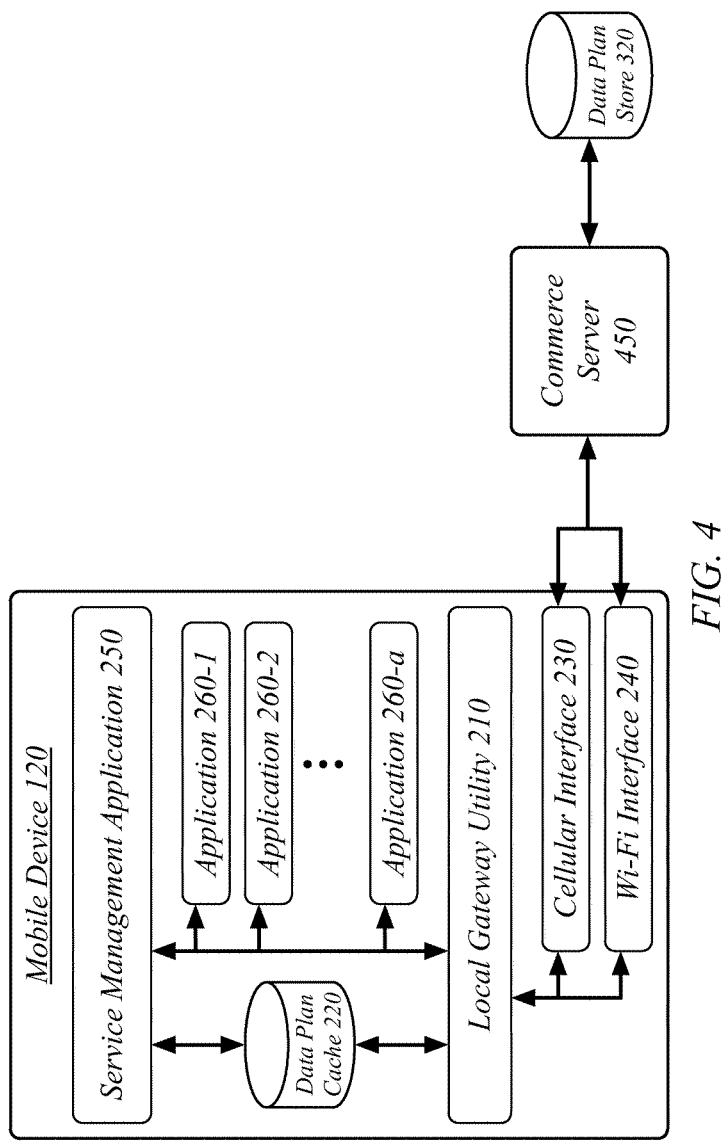
FIG. 4 illustrates an embodiment of the mobile device interacting with a commerce server.

FIG. 4 illustrates an embodiment of the mobile device 120 interacting with a commerce server 450. The commerce server 450 may be used by the mobile device 120 to purchase additional context-specific data plans and activate those context-specific data plans for the mobile device 120.

Context-specific data plans may be promoted to the user of the mobile device 120 through a plurality of channels. In one case, the user of mobile device 120 may access a service management application 250. The service management application 250 may present the user with a plurality of context-specific data plans available for purchase. The service management application 250 may receive a user selection of one or more context-specific data plans and carry out the purchase of the selected context-specific data plans on behalf of the user. The service management application 250 may be specific to the purchasing of data plans, specific to the purchasing of context-specific data plans, or may empower the purchasing of additional goods and services such as applications and devices. Plans may additionally be communicated via interstitial advertisements, banner advertisements, embedded advertisements, SMS message, voice message, Unstructured Supplementary Service Data (USSD), or any other mechanism for communicating promotions Purchasing context-specific data plans may be performed via interaction with a commerce server 450. In some embodiments, the commerce server 450 may be operated by the operator of the zero-rated proxy server 150. In other embodiments, the commerce server 450 may be operated by the provider of the cellular system 130. In either embodiment, the purchasing of context-specific data plans may be performed via joint interaction with the operator of the zero-rated proxy server 150 and the operator of the cellular system 130. A purchased context-specific data plan may be stored in the data plan store 320, with the data plan store 320 serving as the or one of the canonical, trusted stores for context-specific data plans. The purchased context-specific data plan may also be stored in the data plan cache 220 for local access to the active context-specific data plans of the mobile device 120. Purchasing may be performed via credit transactions, debit transactions against a bank account, debit transactions against a user account with the cellular provider, or according to any other technique for purchasing. In some cases, a user may be offered a promotion loan to purchase a context-specific data plan.

In some cases, the service management application 250 may promote context-specific data plans to the user of mobile device 120 in response to predicted interest on the part of the user. A proxy server, such as zero-rated proxy server 150 or non-zero-rated proxy server 160, may monitor network traffic for the mobile device 120 to generate a network usage history for the mobile device 120. The proxy server may predict user interest in the context-specific data plan based on the network usage history. The proxy server may offer, such as via the service management application 250, the context-specific data plan for the mobile device 120 based on the predicted user interest.

Context-specific data plans are associated with a price for a given period of time. Network monitoring by proxy servers may also be used to set the pricing for context-specific data plans. This may be used to set a general price for a context-specific data plan or, alternatively or additionally, to set user-specific prices for context-specific data plans. Previous or existing users of an application may provide an example as to the expected network usage for an application. As such, a price for the context-specific data plan may be determined according to a network usage history of a plurality of installations of the application on a plurality of devices, the network usage history generated at one or more proxy servers used by the plurality of devices. Some users, however, may user greater or lesser amounts of data than the average, which may be determined by monitoring their network activity and comparing it to the general population. As such, a price for the context-specific data plan may be determined according to a predicted network usage of the application on the mobile device 120, the predicted network usage generated according to a network usage history of the mobile device 120, the network usage history generated at one or more proxy servers used by the mobile device 120. In some embodiments, monitoring of a user's or users' network activity may be performed by the local gateway utility 210 on the mobile device 120 or mobile devices.

In some cases, context-specific data plans may be promoted when launching an application of the plurality of applications 260 where the launched application does not have an active context-specific data plan. The local gateway utility 210 may be operative to determine that an application producing a network request has launched on the mobile device 120, determine that the mobile device 120 does not have any active context-specific data plan authorizing the mobile device 120 to perform network requests for the application through the zero-rated proxy server 150, offer a purchase of the context-specific data plan in response to the determination that the mobile device 120 does not have any active context-specific data plan authorizing the mobile device 120 to perform network requests for the application through the zero-rated proxy server 150. The offer may be presented according to an interstitial displayed prior to the content of the launched application, as a banner ad at the top of a screen of the mobile device 120, or through any other form of presentation. The local gateway utility 210 may receive an acceptance of the purchase of the context-specific data plan, perform the purchase of the context-specific data plan with the commerce server 450, and associate the context-specific data plan with the mobile device 120 based on the purchase of the context-specific data plan. The association of the context-specific data plan with the mobile device 120 may include the storage of the association in the data plan store 320, in the data plan cache 220, and with a provider for the cellular system 130. Some of the association may be performed on behalf of the mobile device 120 by the commerce server 450.

Introductory context-specific data plans may be offered for new applications. An introductory context-specific data plan may be distinguished through an atypically short period of time and a requirement that the application be new to the user or to the mobile device 120. Introductory context-specific data plans may be limited to new users of an application in order to allow a very low rate for the introductory context-specific data plan while avoiding longtime users of the application from merely repeatedly purchasing the introductory context-specific data plan when they use the application. A user that regularly uses a video streaming service may be expected to purchase a long-term plan for use of the service rather than repeatedly purchasing a very-short-term plan immediately prior to streaming video. A very short term plan may be associated with, for example, an introductory period of time comprising at most thirty minutes. As such, the local gateway utility 210 may determine that the application has launched for a first time on the mobile device 120 and offer a context-specific data plan with an introductory period in response to the determination that the application launched for the first time.

Context-specific data plans may be offered when the mobile device 120 transitions from a non-metered network, such as provided by the Wi-Fi access points 140, to a metered network, such as the cellular system 130. For example, a user may watch a soccer match on their mobile device 120 while at a café using a Wi-Fi access point provided by the café. The user may wish to then leave the café and take a bus to their place of employment, their home, their school, etc. However, Wi-Fi may not be available while on the bus. If the user does not already have an active context-specific data plan for the network activity they were performing, they may be benefited by being offered an appropriate context-specific data plan to allow them to continue performing the network activity on the metered cellular network without incurring data charges or data allocation debiting. For example, the user watching the soccer match may be offered one or more of a video streaming data plan, a data plan specific to the soccer match they were watching, or a data plan for the application they were using to watch the soccer match.

As such, where the network request is associated with a network resource 180, the local gateway utility 210 may determine that the mobile device 120 was previously accessing the network resource 180 on a non-metered network, determine that continued access to the network resource 180 would use a metered network, determine that the mobile device 120 does not have any active context-specific data plan authorizing the mobile device 120 to access the network resource through the zero-rated proxy server 150, and offer a purchase of the context-specific data plan in response to the determination that the mobile device 120 does not have any active context-specific data plan authorizing the mobile device 120 to access the network resource through the zero-rated proxy server 150. The local gateway utility 210 may receive an acceptance of the purchase of the context-specific data plan, perform the purchase of the context-specific data plan, and associate the context-specific data plan with the mobile device 120 based on the purchase of the context-specific data plan. The local gateway utility 210 may thereafter perform the network request on the metered network via the zero-rated proxy server 150, thereby avoiding the metering of the metered network. In some embodiments, the network resource may be identified by a network address, such that the purchased context-specific data plan is specific to that network address. It will be appreciated that a network address may correspond to, for example, a plurality of IP addresses to allow the use of multiple IP addresses that a network service may use. Further, the context-specific data plan may be purchased to further the access of a particular network resource 180, but be general to an application being used to access to the network resource 180 and empowering the user to use the application to access other resources without incurring data fees or data allocation debiting.

In general, monitoring a user's network activity on a non-metered network may suggest context-specific data plans appropriate to the user. For example, the local gateway utility 210 or non-zero-rated proxy server 160 may determine one or more context-specific data plans that would authorize the mobile device 120 to use the zero-rated proxy server 150 to perform network activities on the metered network that they have already performed on a non-metered network. For example, one or more applications may be identified as producing network traffic on a non-metered network, with the mobile device 120 promoting one or more context-specific data plans to use the one or more applications via the zero-rated proxy server 150 when on a metered network. One or more network resources may be identified as producing network traffic when accessed on a non-metered network, with the mobile device 120 promoting one or more context-specific data plans to access the one or more network resources via the zero-rated proxy server 150 when on a metered network.

Context-specific data plans may also be promoted based on associated activity, wherein interest in one service corresponds to a potential interest in another service. For example, a user of the mobile device 120 accessing a score for a soccer match may be taken as an opportunity to promote a data plan allowing access to video stream for that soccer match. Similarly, a user's interest in soccer matches (e.g., checking scores, liking on a social network, discussing via messaging) may be used as an opportunity to offer streaming data plans for upcoming matches. In general, any aspect of a user's behavior may be monitored, used to determine a potential interest in a network resource 180, and therefore used to generate a promotion for a context-specific data plan allowing access to the network resource 180.

A context-specific data plan may be offered for a bundle of applications. For example, a particular corporation may produce a plurality of applications, all of the applications for integration with their services (e.g., a suite of applications for use with a particular social networking service). A common application-bundle-specific data plan may be offered for the plurality of applications. In general, the operator of the zero-rated proxy server 150 or cellular system 130 may determine application bundles and offer application-bundle-specific data plans to users.

In some embodiments, the user history for a user of the mobile device 120 may be used to suggest additional purchases. For example, a user with a history of calling a certain region or country may be promoted a voice plan for that country or region. Alternatively or additionally, the user may be promoted a data-based VoIP application with an associated application-specific data plan that would provide voice service at a lower cost than a voice plan. Similarly, a user with a history of sending short message service (SMS) messages to a certain region or country may be promoted an SMS plan for that country or region. Alternatively or additionally, the user may be promoted a data-based messaging application with an associated application-specific data plan that would provide messaging service at a lower cost than an SMS plan. Further, voice plans, SMS plans, data-based voice alternatives, and data-based messaging alternatives may be promoted prospectively based on the contacts for a user, such as may be stored on a mobile device 120.

Similarly, contacts or other user associations of the user may be used to select context-specific data plans for promotion. A user may have a set of user associations defining other users with which they are associated. This may be determined according to user contacts, user chat history, user call history, user messaging history, explicit associations on a social network, or according to any other technique for associating an individual with other individuals. Users may be promoted context-specific data plans for applications and network resources used by other associated users. Users may be promoted context-specific data plans for applications and network resources that may be used for interacting with other associated users. For example, a user may be promoted a multiplayer game and an application-specific data plan for that multiplayer game in response to a determination that the user's friends play the game, with the game and plan promoted as being derived from the user's friends' activity. A user may be promoted a video streaming package for an event that their friends have already purchased a video streaming package for. In general, any purchasing or network activity by a user's associates may be used to generate context-specific data plan promotions for a user.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

FIG. 5 illustrates one embodiment of a first logic flow 500. The logic flow 500 may be representative of some or all of the operations executed by one or more embodiments described herein.

In the illustrated embodiment shown in FIG. 5, the logic flow 500 may receive a network request at a local gateway utility 210 on a mobile device 120 at block 502.

The logic flow 500 may determine that the network request corresponds to a context-specific data plan for the mobile device 120, the context-specific data plan authorizing performance of the network request through a zero-rated proxy server 150 at block 504.

The logic flow 500 may perform the network request using the zero-rated proxy server 150 at block 506.

The embodiments are not limited to this example.

FIG. 6 illustrates one embodiment of a second logic flow 600. The logic flow 600 may be representative of some or all of the operations executed by one or more embodiments described herein.

In the illustrated embodiment shown in FIG. 6, the logic flow 600 may receive a network request at a zero-rated proxy server 150 from a mobile device 120 at block 602.

The logic flow 600 may determine that the network request corresponds to a context-specific data plan for the mobile device 120, the context-specific data plan authorizing performance of the network request through the zero-rated proxy server 150 at block 604.

The logic flow 600 may perform the network request using the zero-rated proxy server 150 as an intermediary at block 606.

The embodiments are not limited to this example.

Figure 7:
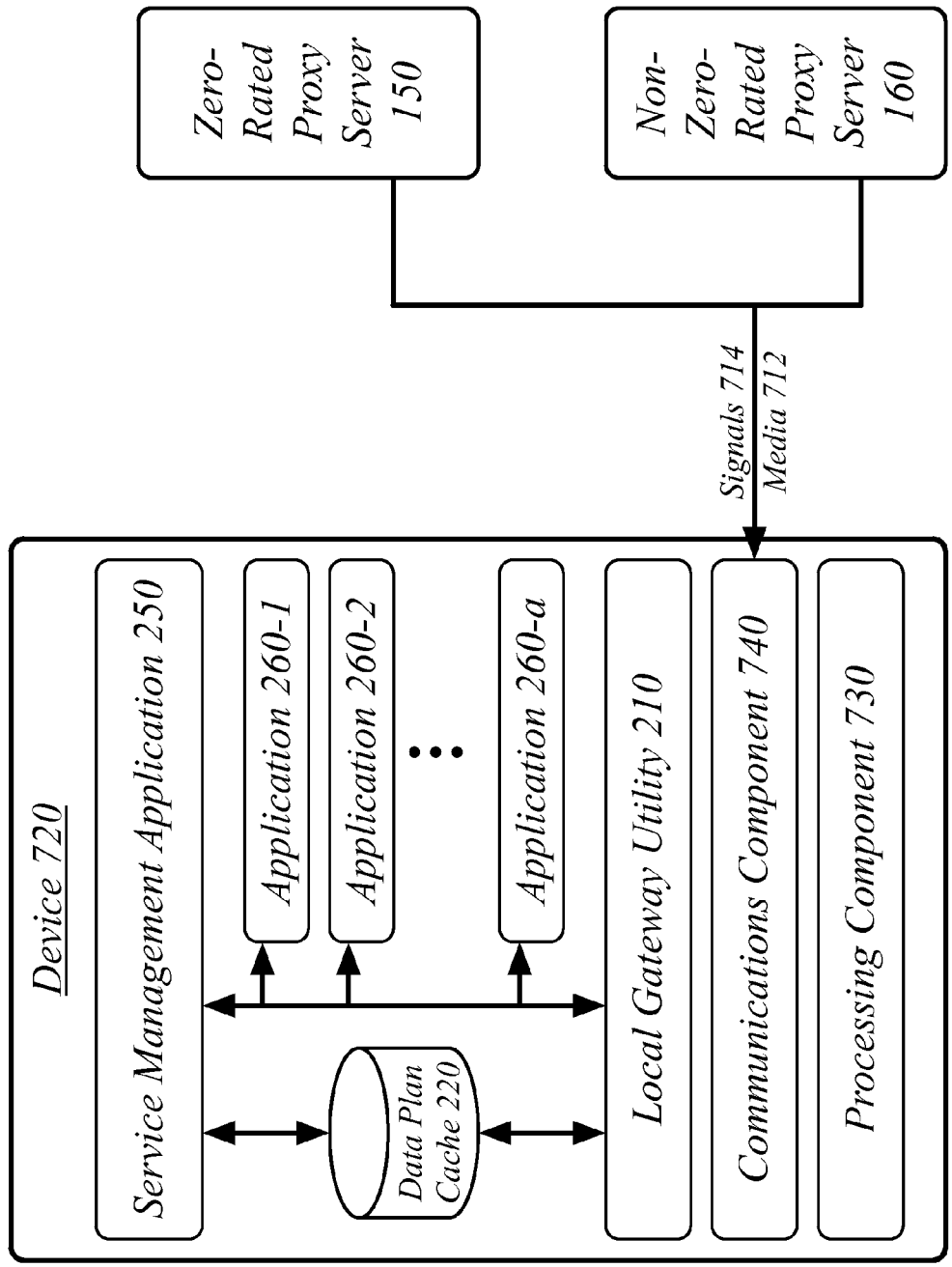
FIG. 7 illustrates an embodiment of a centralized system for the system of FIG. 1.

FIG. 7 illustrates a block diagram of a centralized system 700. The centralized system 700 may implement some or all of the structure and/or operations for the selective zero-rating system 100 in a single computing entity, such as entirely within a single device 720.

The device 720 may comprise any electronic device capable of receiving, processing, and sending information for the selective zero-rating system 100. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The device 720 may execute processing operations or logic for the selective zero-rating system 100 using a processing component 730. The processing component 730 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The device 720 may execute communications operations or logic for the selective zero-rating system 100 using communications component 740. The communications component 740 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 740 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 712, 742 include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The device 720 may communicate with other devices over a communications media 712 using communications signals 714 via the communications component 740. The devices may be internal or external to the device 720 as desired for a given implementation. For example, the device 720 may communicate with the zero-rated proxy server 150 and the non-zero-rated proxy server 160.

Figure 8:
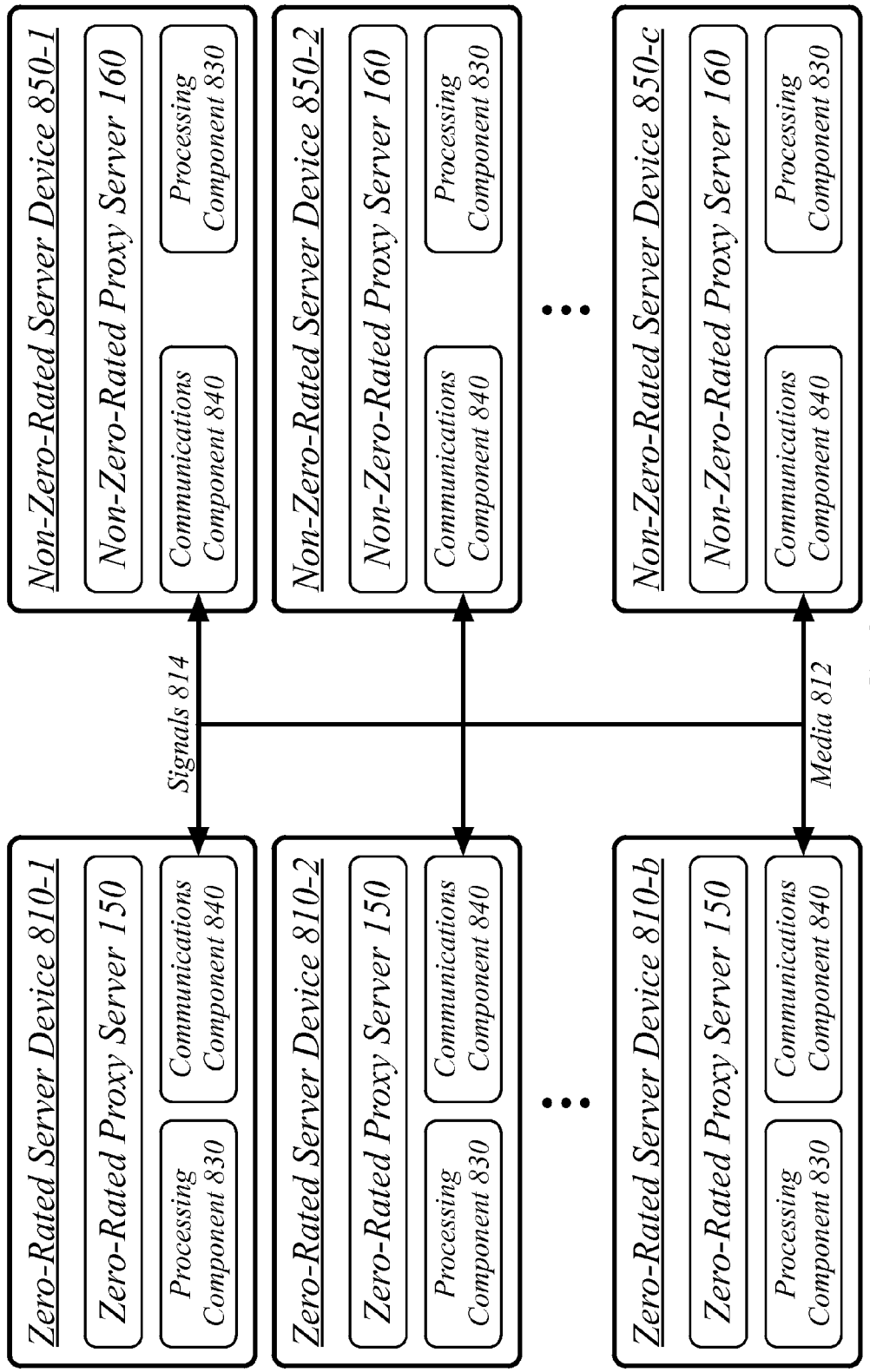
FIG. 8 illustrates an embodiment of a distributed system for the system of FIG. 1.

FIG. 8 illustrates a block diagram of a distributed system 800. The distributed system 800 may distribute portions of the structure and/or operations for the selective zero-rating system 100 across multiple computing entities. Examples of distributed system 800 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 800 may comprise server devices 810, 850. In general, the server devices 810, 850 may be the same or similar to the client device 720 as described with reference to FIG. 7. For instance, the server devices 810, 850 may each comprise a processing component 830 and a communications component 840 which are the same or similar to the processing component 730 and the communications component 740, respectively, as described with reference to FIG. 7. In another example, the server devices 810, 850 may communicate over a communications media 812 using communications signals 814 via the communications components 840.

The server devices 810, 850 may comprise or employ one or more server programs that operate to perform various methodologies in accordance with the described embodiments. In one embodiment, for example, a plurality of zero-rated server devices 810 may implement a plurality of zero-rated proxy servers 150. The plurality of non-zero-rated server devices 850 may implement a plurality of non-zero-rated proxy servers 160. The server devices 810, 850 may exchange signals 814 over media 812 to coordinate the providing of proxy services to mobile devices. The server devices 810, 850 may exchange signals 814 over media 812 with the user data store 330 and data plan store 320 for the storage, analysis, and retrieval of user data and data plans.

Figure 9:
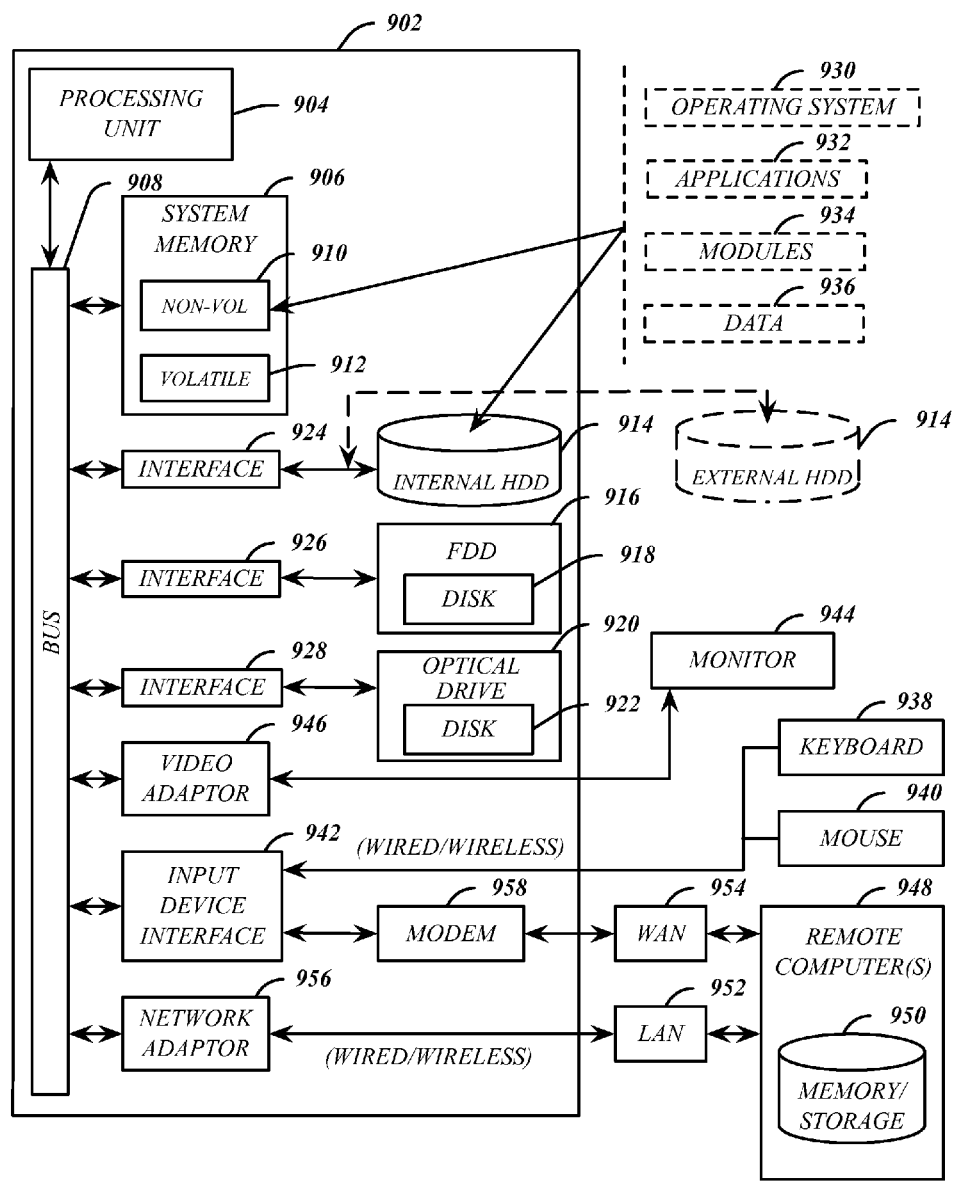
FIG. 9 illustrates an embodiment of a computing architecture.

FIG. 9 illustrates an embodiment of an exemplary computing architecture 900 suitable for implementing various embodiments as previously described. In one embodiment, the computing architecture 900 may comprise or be implemented as part of an electronic device. Examples of an electronic device may include those described with reference to FIG. 8, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 900. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 900 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 900.

As shown in FIG. 9, the computing architecture 900 comprises a processing unit 904, a system memory 906 and a system bus 908. The processing unit 904 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multiprocessor architectures may also be employed as the processing unit 904.

The system bus 908 provides an interface for system components including, but not limited to, the system memory 906 to the processing unit 904. The system bus 908 can be any of several types of bus structure that may further interconnect to a memory bus (with or without a memory controller), a peripheral bus, and a local bus using any of a variety of commercially available bus architectures. Interface adapters may connect to the system bus 908 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 900 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 906 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 9, the system memory 906 can include non-volatile memory 910 and/or volatile memory 912. A basic input/output system (BIOS) can be stored in the non-volatile memory 910.

The computer 902 may include various types of computer-readable storage media in the form of one or more lower speed memory units, including an internal (or external) hard disk drive (HDD) 914, a magnetic floppy disk drive (FDD) 916 to read from or write to a removable magnetic disk 918, and an optical disk drive 920 to read from or write to a removable optical disk 922 (e.g., a CD-ROM or DVD). The HDD 914, FDD 916 and optical disk drive 920 can be connected to the system bus 908 by a HDD interface 924, an FDD interface 926 and an optical drive interface 928, respectively. The HDD interface 924 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 910, 912, including an operating system 930, one or more application programs 932, other program modules 934, and program data 936. In one embodiment, the one or more application programs 932, other program modules 934, and program data 936 can include, for example, the various applications and/or components of the selective zero-rating system 100.

A user can enter commands and information into the computer 902 through one or more wire/wireless input devices, for example, a keyboard 938 and a pointing device, such as a mouse 940. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 904 through an input device interface 942 that is coupled to the system bus 908, but can be connected by other interfaces such as a parallel port, IEEE 1394 serial port, a game port, a USB port, an IR interface, and so forth.

A monitor 944 or other type of display device is also connected to the system bus 908 via an interface, such as a video adaptor 946. The monitor 944 may be internal or external to the computer 902. In addition to the monitor 944, a computer typically includes other peripheral output devices, such as speakers, printers, and so forth.

The computer 902 may operate in a networked environment using logical connections via wire and/or wireless communications to one or more remote computers, such as a remote computer 948. The remote computer 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wire/wireless connectivity to a local area network (LAN) 952 and/or larger networks, for example, a wide area network (WAN) 954. Such LAN and WAN networking environments are commonplace in offices and companies, and facilitate enterprise-wide computer networks, such as intranets, all of which may connect to a global communications network, for example, the Internet.

When used in a LAN networking environment, the computer 902 is connected to the LAN 952 through a wire and/or wireless communication network interface or adaptor 956. The adaptor 956 can facilitate wire and/or wireless communications to the LAN 952, which may also include a wireless access point disposed thereon for communicating with the wireless functionality of the adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wire and/or wireless device, connects to the system bus 908 via the input device interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with wire and wireless devices or entities using the IEEE 802 family of standards, such as wireless devices operatively disposed in wireless communication (e.g., IEEE 802.9 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.9x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 10:
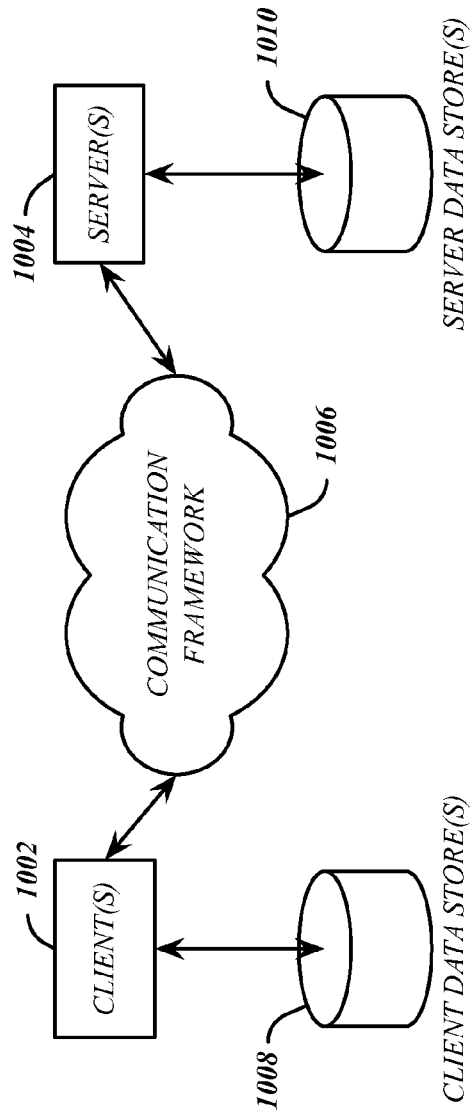
FIG. 10 illustrates an embodiment of a communications architecture.

FIG. 10 illustrates a block diagram of an exemplary communications architecture 1000 suitable for implementing various embodiments as previously described. The communications architecture 1000 includes various common communications elements, such as a transmitter, receiver, transceiver, radio, network interface, baseband processor, antenna, amplifiers, filters, power supplies, and so forth. The embodiments, however, are not limited to implementation by the communications architecture 1000.

As shown in FIG. 10, the communications architecture 1000 comprises includes one or more clients 1002 and servers 1004. The clients 1002 may implement the device 720. The servers 1004 may implement the server devices 810, 850. The clients 1002 and the servers 1004 are operatively connected to one or more respective client data stores 1008 and server data stores 1010 that can be employed to store information local to the respective clients 1002 and servers 1004, such as cookies and/or associated contextual information.

The clients 1002 and the servers 1004 may communicate information between each other using a communication framework 1006. The communications framework 1006 may implement any well-known communications techniques and protocols. The communications framework 1006 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1006 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1002 and the servers 1004. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 11:
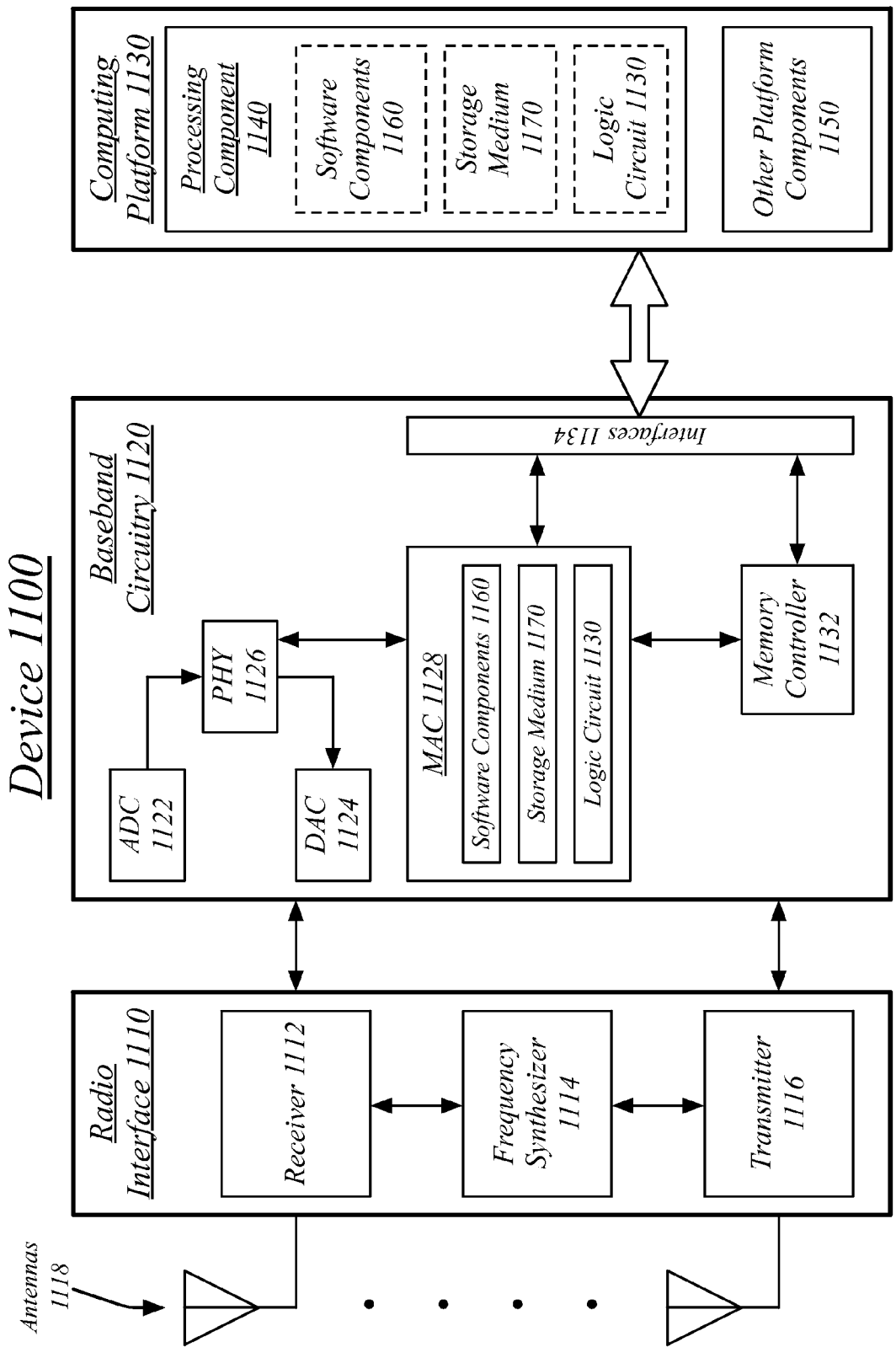
FIG. 11 illustrates an embodiment of a radio device architecture.

FIG. 11 illustrates an embodiment of a device 1100 for use in a multicarrier OFDM system, such as the selective zero-rating system 100. Device 1100 may implement, for example, software components 1160 as described with reference to selective zero-rating system 100 and/or a logic circuit 1130. The logic circuit 1130 may include physical circuits to perform operations described for the selective zero-rating system 100. As shown in FIG. 11, device 1100 may include a radio interface 1110, baseband circuitry 1120, and computing platform 1130, although embodiments are not limited to this configuration. The device 1100 may correspond to the mobile device 120.

The device 1100 may implement some or all of the structure and/or operations for the selective zero-rating system 100 and/or logic circuit 1130 in a single computing entity, such as entirely within a single device. Alternatively, the device 1100 may distribute portions of the structure and/or operations for the selective zero-rating system 100 and/or logic circuit 1130 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 1110 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. Radio interface 1110 may include, for example, a receiver 1112, a transmitter 1116 and/or a frequency synthesizer 1114. Radio interface 1110 may include bias controls, a crystal oscillator and/or one or more antennas 1118. In another embodiment, radio interface 1110 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1120 may communicate with radio interface 1110 to process receive and/or transmit signals and may include, for example, an analog-to-digital converter 1122 for down converting received signals, a digital-to-analog converter 1124 for up converting signals for transmission. Further, baseband circuitry 1120 may include a baseband or physical layer (PHY) processing circuit 1156 for PHY link layer processing of respective receive/transmit signals. Baseband circuitry 1120 may include, for example, a processing circuit 1128 for medium access control (MAC)/data link layer processing. Baseband circuitry 1120 may include a memory controller 1132 for communicating with processing circuit 1128 and/or a computing platform 1130, for example, via one or more interfaces 1134.

In some embodiments, PHY processing circuit 1126 may include a frame construction and/or detection module, in combination with additional circuitry such as a buffer memory, to construct and/or deconstruct communication frames, such as radio frames. Alternatively or in addition, MAC processing circuit 1128 may share processing for certain of these functions or perform these processes independent of PHY processing circuit 1126. In some embodiments, MAC and PHY processing may be integrated into a single circuit.

The computing platform 1130 may provide computing functionality for the device 1100. As shown, the computing platform 1130 may include a processing component 1140. In addition to, or alternatively of, the baseband circuitry 1120, the device 1100 may execute processing operations or logic for the selective zero-rating system 100 and logic circuit 1130 using the processing component 1140. The processing component 1140 (and/or PHY 1126 and/or MAC 1128) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1130 may further include other platform components 1150. Other platform components 1150 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 1100 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a minicomputer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, evolved node B (eNB), subscriber station, mobile subscriber center, radio network controller, router, hub, gateway, bridge, switch, machine, or combination thereof. Accordingly, functions and/or specific configurations of device 1100 described herein, may be included or omitted in various embodiments of device 1100, as suitably desired. In some embodiments, device 1100 may be configured to be compatible with protocols and frequencies associated one or more of the 3GPP LTE Specifications and/or IEEE 1102.16 Standards for WMANs, and/or other broadband wireless networks, cited herein, although the embodiments are not limited in this respect.

Embodiments of device 1100 may be implemented using single input single output (SISO) architectures. However, certain implementations may include multiple antennas (e.g., antennas 1118) for transmission and/or reception using adaptive antenna techniques for beamforming or spatial division multiple access (SDMA) and/or using MIMO communication techniques.

The components and features of device 1100 may be implemented using any combination of discrete circuitry, application specific integrated circuits (ASICs), logic gates and/or single chip architectures. Further, the features of device 1100 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1100 shown in the block diagram of FIG. 11 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A computer-implemented method, comprising:
   receiving, at a commerce server, a selection of a context-specific data plan from a service management application of a client device, the context-specific data plan authorizing performance of a network request through a zero-rated proxy server; and
   associating the context-specific data plan with the client device in a data plan store accessible to the commerce server.

2. The method of claim 1, further comprising promoting the context-specific data plan to the client device.

3. The method of claim 1, further comprising:
   analyzing at least one of a user history of the client device or a list of contacts of the client device;
   identifying the context-specific data plan based on the analyzing; and
   offering the identified context-specific data plan to the client device.

4. The method of claim 1, further comprising offering the context-specific data plan in response to a determination that the client device has transitioned from a non-metered network to a metered network.

5. The method of claim 4, wherein the promoting comprises:
   identifying an application or network resource that produces network traffic on a non-metered network; and
   promoting the context-specific data plan for use by the application, or to access the network resource, via the zero-rated proxy server for use when the client device is on a metered network.

6. The method of claim 1, further comprising setting a price for the context-specific data plan based on a network usage history associated with at least one of the client device, an application on the client device, or a plurality of applications accessing a network.

7. The method of claim 1, wherein the context-specific data plan is associated with a bundle of applications.

8. An apparatus, comprising:
   a processor circuit on a device;
   commerce server logic operative on the processor circuit, the commerce server logic configured to receive a selection of a context-specific data plan from a service management application of a client device, the context-specific data plan authorizing performance of a network request through a zero-rated proxy server; and
   a non-transitory computer-readable medium holding a data plan store, the commerce server logic further configured to associate the context-specific data plan with the client device in the data plan store.

9. The apparatus of claim 8, the processor circuit further configured to promote the context-specific data plan to the client device.

10. The apparatus of claim 8, the processor circuit further configured to:
    analyze at least one of a user history of the client device or a list of contacts of the client device;
    identify the context-specific data plan based on the analyzing; and
    offer the identified context-specific data plan to the client device.

11. The apparatus of claim 8, the processor circuit further configured to offer the context-specific data plan in response to a determination that the client device has transitioned from a non-metered network to a metered network.

12. The apparatus of claim 11, wherein the promoting comprises:
    identifying an application or network resource that produces network traffic on a non-metered network; and
    promoting the context-specific data plan to use the application or access the network resource via the zero-rated proxy server for use when the client device is on a metered network.

13. The apparatus of claim 8, the processor circuit further configured to set a price for the context-specific data plan based on a network usage history associated with at least one of the client device, an application on the client device, or a plurality of applications accessing a network.

14. The apparatus of claim 8, wherein the context-specific data plan is associated with a bundle of applications.

15. At least one non-transitory computer-readable storage medium comprising instructions that, when executed, cause a system to:
    receive, at a commerce server, a selection of a context-specific data plan from a service management application of a client device, the context-specific data plan authorizing performance of a network request through a zero-rated proxy server; and
    associate the context-specific data plan with the client device in a data plan store accessible to the commerce server.

16. The medium of claim 15, further storing instructions that, when executed, cause the system to promote the context-specific data plan to the client device.

17. The medium of claim 15, further storing instructions that, when executed, cause the system to:
    analyze at least one of a user history of the client device or a list of contacts of the client device;
    identify the context-specific data plan based on the analyzing; and
    offer the identified context-specific data plan to the client device.

18. The medium of claim 15, further storing instructions that, when executed, cause the system to offer the context-specific data plan in response to a determination that the client device has transitioned from a non-metered network to a metered network.

19. The medium of claim 18, wherein the promoting comprises:

identifying an application or network resource that produces network traffic on a non-metered network; and promoting the context-specific data plan to use the application or access the network resource via the zero-rated proxy server for use when the client device is on a metered network.

20. The medium of claim 15, further storing instructions that, when executed, cause the system to set a price for the context-specific data plan based on a network usage history associated with at least one of the client device, an application on the client device, or a plurality of applications accessing a network.

\* \* \* \* \*